UNITED STATES PATENT OFFICE.

H. K. TAYLOR AND D. M. GRAHAM, OF CLEVELAND, OHIO.

IMPROVEMENT IN TREATING OILS.

Specification forming part of Letters Patent No. 54,978, dated May 22, 1866.

*To all whom it may concern:*

Be it known that we, H. K. TAYLOR and D. M. GRAHAM, of Cleveland, Cuyahoga county, and State of Ohio, have made certain new and useful Improvements in the Mode of Treating Oil; and we do hereby declare that the following is a full and complete description of the same.

The distillate or proceeds of oil after distillation is introduced into an agitator, and the temperature raised to from 80° to 100° Fahrenheit by means of hot water or steam. The object in raising the temperature of the oil in the agitator is to promote the decomposition of chloride of sodium by sulphuric acid. After standing for a few minutes to settle, the water is drawn from the bottom of the agitator. The agitation of the oil is then commenced, and sulphuric acid introduced by passing it in small streams upon the surface. The gravity of the acid mentioned in the specification is about 1.66. While the acid is running, chloride of sodium or salt is added by means of a sieve or other means, by which its thorough diffusion through the oil and acid can be secured. The agitation is continued from ten minutes to half an hour, according to the nature of the distillate, relating to its color and gravity. It is then stopped and the contents of the tub suffered to stand for the sediment to settle, when the latter is drawn off. This treatment is repeated once or twice. The last time the oil leaving is suffered to stand until it is clear of sediment and bright, which requires from one-half to three-quarters of an hour. After the sediment is drawn off the oil is agitated for from five to ten minutes with a solution of the salts or compounds of sodium, barium, or strontium, which precipitates the sulphuric acid. It may then, remaining in the oil, be agitated with water after standing from half an hour to an hour, and all water and sulphate of soda, baryta, or strontium being drawn off that can be removed, the contents of the agitator are drawn into a shallow tub, called a "bleecher," and suffered to stand exposed to a strong light for twelve hours or more, when it is ready for decantation into barrels.

About proportions per barrel of forty gallons: For light-colored distillate, three and one-fourth pounds sulphuric acid, one pound salt; old process, five and one-half to seven pounds sulphuric acid. For medium-colored distillate, four and one-half pounds sulphuric acid, one to one and one-half salt; old process, six and one-half to eight pounds sulphuric acid. For dark-colored distillate, five pounds sulphuric acid, one and one-half pound salt; old process, eight to ten pounds sulphuric acid. For deodorizing light naphtha, two pounds sulphuric acid, one pound salt. Two tubs of light-colored distillate of the same gravity gave results as follows: One, by our treatment, ignited at 137°; the other, by the ordinary treatment, ignited at 112°. Two other tubs of oil, one of gravity 47° Baumé, gave, by our process, the igniting-point at 124° Fahrenheit; the other, of gravity 44° Baumé, treated by the ordinary process, gave the igniting point at 114° Fahrenheit. One specimen of oil, igniting at 60° before treating, gave, after treating, the igniting-point at 121°. The estimated igniting-point of this oil, by the common treatment, is 85°.

The addition of sulphuric acid and salt to the oil, as before stated, produces sulphate of soda, chlorine, and hydrochloric acid. The hydrochloric acid in its nascent states reacts powerfully upon the oil, precipitating its mucilaginous portions, while the chlorine replaces a portion of the hydrogen of the oil. Thus the oil, after treatment, has a portion of its hydrogen replaced by chlorine, forming a chloride or chlorides.

In this treatment sulphuric acid is made to act on fluor-spar, both introduced into the oil or fluoride of calcium, producing nascent hydrofluoric acid, fluorine, and sulphate of lime. The fluorine reacts upon the oil, producing fluorides of carbon in a manner similar to the production of chlorides of carbon. In using peroxide of manganese it would be necessary to use the maximum temperature to secure the best results. In place of chloride of sodium, chloride of sodium and peroxide of manganese may be used, forming nascent chlorine, which, acting upon the oil, produces chlorides of carbon. The treatment may be the same as in the case of chloride of sodium and sulphuric acid alone.

Thus it will be seen that our process raises the igniting-point, thereby improving the quality of the oil and increasing its quantity by utilizing the lighter kinds, which before were unfit for illuminating purposes. It will likewise be observed that there is a large saving over the old process in the expense of chemicals.

The inflammability and consequent low igniting-point of the oil being due to excess of hydrogen, our process, by expelling hydrogen and substituting chlorine or other gases of low inflammability, raises the igniting point and diminishes its inflammability. Naphtha or benzine, combined with tar, or the residuum left in the distillation of oil or in the generator of illuminating-gas, may be treated by our described mode so as to produce a good quality of oil.

In addition to the principle of substitution we embrace the use of agents in their nascent state—thus, nascent hydrochloric acid, nascent chlorine, and their equivalents.

What we claim as our improvement, and desire to secure by Letters Patent, is—

1. The treatment of petroleums and other similar hydrocarbons by means of nascent hydrochloric acids, chlorine fluorine, or other equivalent chemical reagent, so as to change the constitution of the oil and purify it, substantially as herein described.

2. The use of sulphuric acid, nitric acid, or salts containing these or either of them, when used in combination with other materials, such as herein described, or their equivalents, for the purpose of treating petroleum or other hydrocarbons, as described.

H. K. TAYLOR.
DAN. M. GRAHAM.

Witnesses:
W. H. BURRIDGE,
CHAS. D. SMITH.